(12) United States Patent
Gohr et al.

(10) Patent No.: US 12,179,462 B2
(45) Date of Patent: Dec. 31, 2024

(54) PRESSURE-SENSITIVE-ADHESIVE RELEASE FILM FOR ORIENTED HDPE

(71) Applicant: Jindal Innovation Center SRL, Virton (BE)

(72) Inventors: Eric T. Gohr, Sharpsburg, GA (US); Robert M. Sheppard, Peachtree City, GA (US)

(73) Assignee: Jindal Innovation Center SRL, Virton (BE)

( * ) Notice: Subject to any disclaimer, the term of this patent is extended or adjusted under 35 U.S.C. 154(b) by 0 days.

(21) Appl. No.: 18/623,252

(22) Filed: Apr. 1, 2024

(65) Prior Publication Data

US 2024/0239089 A1    Jul. 18, 2024

Related U.S. Application Data

(63) Continuation of application No. PCT/US2023/025230, filed on Jun. 13, 2023.

(60) Provisional application No. 63/197,690, filed on Jul. 27, 2022.

(51) Int. Cl.
| | | |
|---|---|---|
| *B29C 48/22* | (2019.01) | |
| *B29C 48/00* | (2019.01) | |
| *B32B 7/12* | (2006.01) | |
| *B32B 25/02* | (2006.01) | |
| *B32B 27/08* | (2006.01) | |
| *B32B 27/18* | (2006.01) | |
| *B32B 27/30* | (2006.01) | |
| *B32B 27/32* | (2006.01) | |
| *B29K 23/00* | (2006.01) | |
| *B29K 31/00* | (2006.01) | |

(52) U.S. Cl.
CPC ............ *B32B 27/08* (2013.01); *B29C 48/022* (2019.02); *B29C 48/22* (2019.02); *B32B 7/12* (2013.01); *B32B 25/02* (2013.01); *B32B 27/18* (2013.01); *B32B 27/306* (2013.01); *B32B 27/32* (2013.01); *B29K 2023/0616* (2013.01); *B29K 2023/0633* (2013.01); *B29K 2031/04* (2013.01); *B32B 2250/03* (2013.01); *B32B 2250/05* (2013.01); *B32B 2250/242* (2013.01); *B32B 2250/246* (2013.01); *B32B 2250/40* (2013.01); *B32B 2255/10* (2013.01); *B32B 2255/20* (2013.01); *B32B 2255/26* (2013.01); *B32B 2264/1021* (2020.08); *B32B 2307/518* (2013.01); *B32B 2307/704* (2013.01); *B32B 2323/043* (2013.01); *B32B 2323/046* (2013.01); *B32B 2331/04* (2013.01)

(58) Field of Classification Search
None
See application file for complete search history.

(56) References Cited

U.S. PATENT DOCUMENTS

| | | |
|---|---|---|
| 4,870,122 A | 9/1989 | Lu |
| 5,714,547 A | 2/1998 | Li et al. |
| 6,602,609 B1 | 8/2003 | Kong |
| 6,663,947 B2 | 12/2003 | Freedman et al. |
| 2006/0115613 A1 | 6/2006 | Dawe et al. |
| 2007/0142558 A1 | 6/2007 | Mavridis |
| 2016/0217712 A1 | 7/2016 | Stevenson et al. |
| 2021/0213719 A1* | 7/2021 | Ambroise ............... B32B 27/16 |
| 2021/0245480 A1 | 8/2021 | Gohr et al. |

FOREIGN PATENT DOCUMENTS

WO    2021021354 A1    2/2021

OTHER PUBLICATIONS

Taina Matos, International Search Report and Written Opinion of the ISA, Aug. 28, 2023, USPTO, Alexandria US.
Erik Osterrieder, Chapter II Demand, Sep. 26, 2023, Houston US.

* cited by examiner

*Primary Examiner* — Sheeba Ahmed
(74) *Attorney, Agent, or Firm* — Kearney, McWilliams & Davis; Erik J. Osterrieder

(57) ABSTRACT

In one example embodiment, disclosed is a polyethylene film comprising a core layer comprising at least 85 wt. % high-density polyethylene. Further, the polyethylene film comprises a first tie layer on a first side of the core layer consisting essentially of: (i) at least about 50 wt. % high-density polyethylene; and (ii) from 5 wt. % through 40 wt. % of each of: (a) an olefin-block copolymer; and (b) low-density polyethylene polymer and/or ethylene-vinyl acetate polymer. Further still, the polyethylene film comprises a first skin layer on the first tie layer, wherein the first skin layer comprises a polyethylene-based polymer, silicone, and antiblock agent, wherein the polyethylene film is coextruded and oriented either monoaxially or biaxially. Yet further, the polyethylene film is adhered to face stock, which optionally excludes silicone.

19 Claims, No Drawings

PRESSURE-SENSITIVE-ADHESIVE RELEASE FILM FOR ORIENTED HDPE

REFERENCE TO RELATED APPLICATION

This is a continuation application, which claims priority to Patent Treaty Cooperation application number PCT/US23/25230 filed on 13 Jun. 2023 that claims priority to United States provisional patent application Ser. No. 63/392,821 filed on 27 Jul. 2022 that is hereby incorporated by this reference in its entirety.

FIELD

This disclosure relates to compositions of oriented, high-density, polyethylene films, including methods and uses pertaining to the same, and adhesion to face stock, which is at least substantially free from silicone.

BACKGROUND

Current pressure-sensitive label laminations in the market for items such as bottle labels use a lamination of face stocks to release liners, such as PET, paper, and BOPP. However, combinations of dissimilar materials pose recyclability problems. Also, release liners are coated with silicone in a separate process step, which adds cost to the overall structure. Needs exists for recyclability solutions, such as by replacing dissimilar materials in the laminations by producing all-PE films that are made to provide other desirable characteristics, such as good pressure-sensitive label release performance along with improvements in cost, resource and/or manufacturing time and ease.

SUMMARY

In one example embodiment, disclosed is a polyethylene film comprising a core layer comprising at least 85 wt. % high-density polyethylene. Further, the polyethylene film comprises a first tie layer on a first side of the core layer consisting essentially of: (i) at least about 50 wt. % high-density polyethylene; and (ii) from 5 wt. % through 40 wt. % of each of: (a) an olefin-block copolymer; and (b) low-density polyethylene polymer and/or ethylene-vinyl acetate polymer. Further still, the polyethylene film comprises a first skin layer on the first tie layer, wherein the first skin layer comprises a polyethylene-based polymer, silicone, and antiblock agent, wherein the polyethylene film is coextruded and oriented. Yet further, the polyethylene film is adhered to face stock, which excludes silicone.

BRIEF DESCRIPTION OF THE APPENDIX

The appendix provides the test method used for the peel adhesion measurements values reported herein.

DETAILED DESCRIPTION

Generally disclosed are oriented (i.e., monoaxially ("MO") and/or biaxially ("BO"), multilayer, polyethylene ("PE") films comprising, consisting essentially of, or consisting of: a high-density polyethylene ("HDPE") core layer; and at least one functional copolymer, terpolymer, or polyethylene skin coextruded with a release layer, wherein the skin and release layers are collectively denominated a "coextruded release layer" herein. Such films reduce or eliminate recyclability problems because their constituent polymers either consist or consist essentially of polyethylene-based polymers. Furthermore, the disclosed films have at least one skin layer coextruded with a release layer, a structure and method that results in cost-savings as compared to having a release layer coated onto the skin. Surprisingly, as further shown in the example embodiments section, the disclosed films have release forces to a release liner that are similar to films having a coated release layer.

As used herein, "polymer" may be used to refer to homopolymers, copolymers, interpolymers, terpolymers, etc. Likewise, a "copolymer" may refer to a polymer comprising two monomers or to a polymer comprising three or more monomers.

As used herein, "intermediate" is defined as the position of one layer of a multilayered film, wherein said layer lies between two other identified layers. In some embodiments, the intermediate layer may be in direct contact with either or both of the two identified layers. In other embodiments, additional layers may also be present between the intermediate layer and either or both of the two identified layers.

As used herein, "elastomer" is defined as a propylene-based or ethylene-based copolymer that can be extended or stretched with force to at least 100% of its original length, and upon removal of the force, rapidly (e.g., within 5 seconds) returns to its original dimensions.

As used herein, "plastomer" is defined as a propylene-based or ethylene-based copolymer having a density in the range of 0.850 g/cm$^3$ to 0.920 g/cm$^3$ and a DSC melting point of at least 40° C.

As used herein, "substantially free" is defined to mean that the referenced film layer is largely, but not wholly, absent a particular component. In some embodiments, small amounts of the component may be present within the referenced layer as a result of standard manufacturing methods, including recycling of film scraps and edge trim during processing.

By "consist essentially of," what is meant, for example, is that a particular film layer does not have any more than 1 wt % or 2 wt % or 3 wt % or 4 wt % or 5 wt % or 6%) wt % or 7 wt % or 8 wt % or 9 wt % or 10 wt % or any combination of ranges incorporating the foregoing percentages (e.g., from 5 wt % through 10 wt % or greater than 5 wt % or less than 10 wt %) of other polymers in the bulk material constituting the film layer's composition, but "consist essentially of" does not exclude the possibility that the particular film layer also has additives, such as anti-slip agents, anti-blocking agents, anti-oxidants, pigments, whitening agents, cavitation agents, etc. regardless of what polymers or other materials make up the additive(s).

By "consisting of," what is meant is a closed set as opposed to "comprising," which is an open set.

As used herein, "about" means the number itself and/or within 5% of the stated number. For instance, with about 5%, this means 5 and/or any number or range within the range of 4.75 to 5.25, e.g., 4.75 to 4.96, 4.81 to 5.1, etc.

Core Layer

As is known to those skilled in the art, the core layer of a multilayered film is most commonly the thickest layer and provides the foundation of the multilayered structure. In some embodiments, the core layer comprises, consists essentially of, or consists of monoaxially oriented polyethylene ("MOPE") or biaxially oriented polyethylene ("BOPE"), such as a high-density polyethylene film ("HDPE") and/or other PE's having a density greater equal to or greater than 0.94 g/cm$^3$, 0.95 g/cm$^3$, and/or 0.96 g/cm$^3$. Embodiments have core layers with only PE polymers except for optional additives, wherein the PE polymers include embodiments, for example, at least 85 wt. %, at least 90 wt. %, at least 95 wt. %, or at least 98 wt. % PE(s), each having a density equal to or greater than 0.94 g/cm$^3$, 0.95 g/cm$^3$, and/or 0.96 g/cm$^3$, and the balance being one or more PEs comprising, consisting essentially of, or consisting of MDPEs, LLDPEs, VLDPEs, and/or EVAs, save any optional additives therein. In alternative embodiments, the core layer also may include other polymers, including, for instance, oriented polypropylene ("OPP"), oriented polyester ("OPET"), oriented polylactic acid ("OPLA"), and combinations thereof. In still alternate embodiments the core layer also may include lesser amounts of additional polymer (s) selected from the group consisting of ethylene polymer, ethylene-propylene copolymers, ethylene-propylene-butene terpolymers, elastomers, plastomers, different types of metallocene-LLDPEs (m-LLDPEs), and combinations thereof.

Further, the core layer may include a hydrocarbon resin. Hydrocarbon resins may serve to enhance or modify the flexural modulus, improve processability, or improve the barrier properties of the film. The resin may be a low molecular weight hydrocarbon that is compatible with the core polymer. Optionally, the resin may be hydrogenated. The resin may have a number average molecular weight less than 5000, preferably less than 2000, most preferably in the range of from 500 to 1000. The resin can be natural or synthetic and may have a softening point in the range of from 60° C. to 180° C.

Suitable hydrocarbon resins include, but are not limited to petroleum resins, terpene resins, styrene resins, and cyclopentadiene resins. In some embodiments, the hydrocarbon resin is selected from the group consisting of aliphatic hydrocarbon resins, hydrogenated aliphatic hydrocarbon resins, aliphatic/aromatic hydrocarbon resins, hydrogenated aliphatic aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, polyterpene resins, terpene-phenol resins, rosins and rosin esters, hydrogenated rosins and rosin esters, and combinations thereof.

The amount of such hydrocarbon resins, either alone or in combination, in the core layer is preferably in the range of from 1 wt % through 5 wt %, or any combination of ranges therebetween, based on the total weight of the core layer.

The core layer may further comprise one or more additives such as opacifying agents, pigments, colorants, cavitating agents, slip agents, antioxidants, anti-fog agents, anti-static agents, fillers, moisture barrier additives, gas barrier additives, and combinations thereof, as discussed in further detail below. A suitable anti-static agent is ARMOSTAT™ 475 (commercially available from Akzo Nobel of Chicago, Ill.).

Cavitating agents may be present in the core layer in an amount less than 30 wt %, preferably less than 20 wt %, most preferably in the range of from 2 wt % to 15 wt %, based on the total weight of the core layer.

Preferably, the total amount of additives in the core layer comprises up to about 20 wt. % of the core layer, but some embodiments may comprise additives in the core layer in an amount up to about 30 wt % of the core layer.

The core layer preferably has a thickness in the range of from about 5 µm to 100 µm, more preferably from about 5 µm to 50 µm, most preferably from 5 µm to 25 µm.

Optional Tie Layer(s)

Tie layer(s) of a multilayered film is typically used to connect two other layers of the multilayered film structure, e.g., a core layer and a sealant layer, and is positioned intermediate these other layers. In various embodiments, the films may have zero, one or two tie layers. The tie layer(s) may have the same or a different composition as compared to the core layer.

In some embodiments, the tie layer is in direct contact with the surface of the core layer. In other embodiments, another layer or layers may be intermediate the core layer and the tie layer. The tie layer may comprise one or more polymers. In addition, the polymers may include $C_2$ polymers, maleic-anhydride-modified polyethylene polymers, $C_3$ polymers, $C_2C_3$ random copolymers, $C_2C_3C_4$ random terpolymers, heterophasic random copolymers, $C_4$ homopolymers, $C_4$ copolymers, metallocene polymers, propylene-based or ethylene-based elastomers and/or plastomers, ethyl-methyl acrylate (EMA) polymers, ethylene-vinyl acetate (EVA) polymers, polar copolymers, and combinations thereof. For example, one polymer may be a grade of VISTAMAXX™ polymer (commercially available from ExxonMobil Chemical Company of Baytown, Tex.), such as VM6100 and VM3000 grades. Alternatively, suitable polymers may include VERSIFY™ polymer (commercially available from The Dow Chemical Company of Midland, Mich.), Basell CATALLOY™ resins such as ADFLEX™ T100F, SOFTELL™ Q020F, CLYRELL™ SM1340 (commercially available from Basell Polyolefins of The Netherlands), PB (propylene-butene-1) random copolymers, such as Basell PB 8340 (commercially available from Basell Polyolefins of The Netherlands), Borealis BORSOFT™ SD233CF, (commercially available from Borealis of Denmark), EXCEED™ 1012CA and 1018CA metallocene polyethylenes, EXACT™ 5361, 4049, 5371, 8201, 4150, 3132 polyethylene plastomers, EMCC 3022.32 low density polyethylene (LDPE) (commercially available from ExxonMobil Chemical Company of Baytown, Tex.).

In some embodiments, the tie layer may further comprise one or more additives such as opacifying agents, pigments, colorants, cavitating agents, slip agents, antioxidants, anti-fog agents, anti-static agents, anti-block agents, fillers, moisture barrier additives, gas barrier additives, and combinations thereof, as discussed in further detail below.

The thickness of the tie layer is typically in the range of from about 0.50 to 25 µm, preferably from about 0.50 µm to 12 µm, more preferably from about 0.50 µm to 6 µm, and most preferably from about 2.5 µm to 5 µm. However, in some thinner films, the tie layer thickness may be from about 0.5 µm to 4 µm, or from about 0.5 µm to 2 µm, or from about 0.5 µm to 1.5 µm.

Skin Layer(s), Including Metallizable Skin Layers and Printable Layers

In some embodiments, the skin layer comprises at least one polymer selected from the group comprising, consisting essentially of, and/or consisting of polypropylene copolymers or terpolymers, which may be grafted or copolymerized, and a metallocene based material of either polypropylene or ethylene propylene copolymer.

The skin layer may also comprise processing aid additives, such as anti-block agents, anti-static agents, slip agents and combinations thereof, as discussed in further detail below.

The thickness of the skin layer depends upon the intended function of the skin layer, but is typically in the range of from about 0.20 µm through 3.5 µm, or from 0.30 µm through 2 µm, or in many embodiments, from 0.50 µm through 1.0 µm. In thin film embodiments, the skin layer thickness may range from about 0.20 µm through 1.5 µm, or 0.50 µm through 1.0 µm.

Additives

Additives present in the film's layer(s) may include, but are not limited to opacifying agents, pigments, colorants, cavitating agents, slip agents, antioxidants, anti-fog agents, anti-static agents, anti-block agents, fillers, moisture barrier additives, gas barrier additives, gas scavengers, and combinations thereof. Such additives may be used in effective amounts, which vary depending upon the property required.

Examples of suitable opacifying agents, pigments or colorants are iron oxide, carbon black, aluminum, titanium dioxide ($TiO_2$), calcium carbonate ($CaCO_3$), and combinations thereof.

Cavitating or void-initiating additives may include any suitable organic or inorganic material that is incompatible with the polymer material(s) of the layer(s) to which it is added, at the temperature of biaxial orientation, in order to create an opaque film. Examples of suitable void-initiating particles are PBT, nylon, solid or hollow pre-formed glass spheres, metal beads or spheres, ceramic spheres, calcium carbonate, talc, chalk, or combinations thereof. The average diameter of the void-initiating particles typically may be from about 0.1 to 10 µm.

Slip agents may include higher aliphatic acid amides, higher aliphatic acid esters, waxes, silicone oils, and metal soaps. Such slip agents may be used in amounts ranging from 0.1 wt % to 2 wt % based on the total weight of the layer to which it is added. An example of a slip additive that may be useful is erucamide. Non-migratory slip agents, used in one or more skin layers of the multilayered films, may include polymethyl methacrylate (PMMA). The non-migratory slip agent may have a mean particle size in the range of from about 0.5 µm to 8 µm, or 1 µm to 5 µm, or 2 µm to 4 µm, depending upon layer thickness and desired slip properties. Alternatively, the size of the particles in the non-migratory slip agent, such as PMMA, may be greater than 20% of the thickness of the skin layer containing the slip agent, or greater than 40% of the thickness of the skin layer, or greater than 50% of the thickness of the skin layer. The size of the particles of such non-migratory slip agent may also be at least 10% greater than the thickness of the skin layer, or at least 20% greater than the thickness of the skin layer, or at least 40% greater than the thickness of the skin layer. Generally spherical, particulate non-migratory slip agents are contemplated, including PMMA resins, such as EPOSTAR™ (commercially available from Nippon Shokubai Co., Ltd. of Japan). Other commercial sources of suitable materials are also known to exist. Non-migratory means that these particulates do not generally change location throughout the layers of the film in the manner of the migratory slip agents. A conventional polydialkyl siloxane, such as silicone oil or gum additive having a viscosity of 10,000 to 2,000,000 centistokes is also contemplated.

Suitable anti-oxidants may include phenolic anti-oxidants, such as IRGANOX® 1010 (commercially available from Ciba-Geigy Company of Switzerland). Such an anti-oxidant is generally used in amounts ranging from 0.1 wt % to 2 wt %, based on the total weight of the layer(s) to which it is added.

Anti-static agents may include alkali metal sulfonates, polyether-modified polydiorganosiloxanes, polyalkylphenylsiloxanes, and tertiary amines. Such anti-static agents may be used in amounts ranging from about 0.05 wt % to 3 wt %, based upon the total weight of the layer(s).

Examples of suitable anti-blocking agents may include silica-based products such as SYLOBLOC® 44 (commercially available from Grace Davison Products of Colombia, Md.), PMMA particles such as EPOSTAR™ (commercially available from Nippon Shokubai Co., Ltd. of Japan), or polysiloxanes such as TOSPEARL™ (commercially available from GE Bayer Silicones of Wilton, Conn.). Such an anti-blocking agent comprises an effective amount up to about 3000 ppm of the weight of the layer(s) to which it is added.

Useful fillers may include finely divided inorganic solid materials such as silica, fumed silica, diatomaceous earth, calcium carbonate, calcium silicate, aluminum silicate, kaolin, talc, bentonite, clay and pulp.

Optionally, nonionic or anionic wax emulsions can be included in the coating(s), i.e., skin layer(s), to improve blocking resistance and/or lower the coefficient of friction. For example, an emulsion of Michem Lube 215, Michem Lube 160 may be included in the skin layer(s). Any conventional wax, such as, but not limited to Carnauba™ wax (commercially available from Michelman Corporation of Cincinnati, Ohio) that is useful in thermoplastic films is contemplated.

Metallization

The outer surface (i.e., side opposite of the coextruded release layer) of a skin layer and/or laminating substrate may undergo metallization after optionally being treated. Metallization may be carried out through conventional methods, such as vacuum metallization by deposition of a metal layer such as aluminum, copper, silver, chromium, or mixtures thereof. Following metallization, a coating may be applied to the outer metallized layer "outside" or "inside" the vacuum chamber to result in the following structure: metallized layer/skin layer/optional tie layer/core/optional tie layer/skin layer/metallized layer. In an additional embodiment, a primer may be applied on the metal surface(s) followed by top coating(s).

In certain embodiments, the metal for metallization is metal oxide, any other inorganic materials, or organically modified inorganic materials, which are capable of being vacuum deposited, electroplated or sputtered, such as, for example, SiOx, AlOx, SnOx, ZnOx, IrOx, wherein x=1 or 2, organically modified ceramics "ormocer", etc. The thickness of the deposited layer(s) is typically in the range from 100 to 5,000 Angstrom or preferably from 300 to 3000 Angstrom.

Surface Treatment

An outer surface of the skin layer of the multilayered film that does not contain silicone may be surface-treated to increase the surface energy to render the film receptive to metallization, coatings, printing inks, adhesives, and/or lamination. The surface treatment can be carried out according to one of the methods known in the art including corona discharge, flame, plasma, chemical treatment, or treatment by means of a polarized flame. If the multilayered film has two skin layers, which each contain silicone, then neither side of the multilayered film's skin layers are treated.

Priming

An intermediate primer coating may be applied to multilayered films. In this case, the film may be first treated by one of the foregoing methods to provide increased active adhesive sites thereon and to the thus-treated film surface there may be subsequently applied a continuous coating of a primer material. Such primer materials are well known in the art and include, for example, epoxy, poly(ethylene imine) (PEI), and polyurethane materials. U.S. Pat. Nos. 3,753,769, 4,058,645 and 4,439,493, each incorporated herein by reference, discloses the use and application of such primers. The primer provides an overall adhesively active surface for thorough and secure bonding with the subsequently applied coating composition and can be applied to the film by conventional solution coating means, for example, by roller application.

Orienting

The films herein are also characterized in certain embodiments as being monoaxially or biaxially oriented. The films can be made by any suitable technique known in the art, such as a tentered or blown process, LISIM™, and others. Further, the working conditions, temperature settings, lines speeds, etc. will vary depending on the type and the size of the equipment used. Nonetheless, described generally here is one method of making the films described throughout this specification. In a particular embodiment, the films are formed and biaxially oriented using the tentered method. In the tentered process, line speeds of greater than 100 m/min to 400 m/min or more, and outputs of greater than 2000 kg/h to 4000 kg/h or more are achievable. In the tenter process, sheets/films of the various materials are melt-blended and coextruded, such as through a 3, 4, 5, 7-layer die head, into the desired film structure. Extruders ranging in diameters from 100 mm to 300 or 400 mm, and length to diameter ratios ranging from 10/1 to 50/1 can be used to melt blend the molten layer materials, the melt streams then metered to the die having a die gap(s) within the range of from 0.5 or 1 to an upper limit of 3 or 4 or 5 or 6 mm. The extruded film is then cooled using air, water, or both. Typically, a single, large diameter roll partially submerged in a water bath, or two large chill rolls set at 20 or 30 to 40 or 50 or 60 or 70° C. are suitable cooling means. As the film is extruded, an air knife and edge pinning are used to provide intimate contact between the melt and chill roll.

Downstream of the first cooling step in this embodiment of the tentered process, the unoriented film is reheated to a temperature of from 80 to 100 or 120 or 150° C., in one embodiment by any suitable means such as heated S-wrap rolls, and then passed between closely spaced differential speed rolls to achieve machine direction orientation. It is understood by those skilled in the art that this temperature range can vary depending upon the equipment, and in particular, upon the identity and composition of the components making up the film. Ideally, the temperature will be below that which will melt the film, but high enough to facilitate the machine direction orientation process. Such temperatures referred to herein refer to the film temperature itself. The film temperature can be measured by using, for example, infrared spectroscopy, the source aimed at the film as it is being processed; those skilled in the art will understand that for transparent films, measuring the actual film temperature will not be as precise. The heating means for the film line may be set at any appropriate level of heating, depending upon the instrument, to achieve the stated film temperatures.

The lengthened and thinned film is passed to the tenter section of the line for TD orientation. At this point, the edges of the sheet are grasped by mechanical clips on continuous chains and pulled into a long, precisely controlled hot air oven for a pre-heating step. The film temperatures range from 100 or 110 to 150 or 170 or 180° C. in the pre-heating step. Again, the temperature will be below that which will melt the film, but high enough to facilitate the step of transverse direction orientation. Next, the edges of the sheet are grasped by mechanical clips on continuous chains and pulled into a long, precisely controlled hot air oven for transverse stretching. As the tenter chains diverge a desired amount to stretch the film in the transverse direction, the process temperature is lowered by at least 2° C. but typically no more than 20° C. relative to the pre-heat temperature to maintain the film temperature so that it will not melt the film.

After stretching to achieve transverse orientation in the film, the film is annealed at a temperature below the melting point, and the film is then cooled from 5 to 10 or 15 or 20 or 30 or 40° C. below the stretching temperature, and the clips are released prior to edge trim, optional coronal, printing and/or other treatment can then take place, followed by winding.

Thus, TD orientation is achieved by the steps of pre-heating the film having been machine oriented, followed by stretching and annealing it at a temperature below the melt point of the film, and then followed by a cooling step at yet a lower temperature. In one embodiment, the films described herein are formed by imparting a transverse orientation by a process of first pre-heating the film, followed by a decrease in the temperature of the process within the range of from 2 or 3 to 5 to 10 or 15 or 20° C. relative to the pre-heating temperature while performing transverse orientation of the film, followed by a lowering of the temperature within the range of from 5° C. to 10 or 15 or 20 or 30 or 40° ° C. relative to the melt point temperature, holding or slightly decreasing (more than 5%) the amount of stretch, to allow the film to anneal. The latter step imparts the low TD shrink characteristics of the films described herein. Thus, for example, where the pre-heat temperature is 120° C., the stretch temperature may be 114° C., and the cooling step may be 98° C., or any temperature within the ranges disclosed. The steps are carried out for a sufficient time to affect the desired film properties as those skilled in the art will understand.

Thus, in certain embodiments the film(s) described herein are biaxially oriented with at least a 5 or 6 or 7 or 11-fold TD orientation and at least a 2 or 3 or 7-fold MD orientation. Being so formed, the at least three-layer (one core, two skin layers, 18-21 µm thickness) possess an ultimate tensile strength within the range of from 100 or 110 to 80 or 90 or 250 MPa in the TD in certain embodiments; and possess an ultimate tensile strength within the range of from 30 or 40 to 150 or 130 MPa in the MD in other embodiments.

INDUSTRIAL APPLICABILITY

The disclosed multilayered films may be stand-alone films or pressure-sensitive-adhesive release films, which are optionally and removably attachable to a release liner to form labels. These multilayered films and labels may be sealed, coated, metallized, and/or laminated to other film structures. The laminating substrate, itself, may for instance, be a oriented PE or a non-oriented, cast or blown PE film with or without the assistance of adhesive(s), increases in temperature and/or pressure, water or solvents, etc.; furthermore, the laminating substrate may or may not be metallized and/or coated. The disclosed multilayered films may be prepared by any suitable methods comprising the steps of co-extruding a multilayered film according to the description and claims of this specification, orienting and preparing the film for intended use such as by coating, printing, slitting, or other converting methods.

For some applications, it may be desirable to laminate the multilayered films or labels to other polymeric film or paper products for purposes such as package decor including printing and metallizing. These activities are typically performed by the ultimate end-users or film converters who process films for supply to the ultimate end-users.

EXPERIMENTAL AND EXAMPLE EMBODIMENTS

In addition to the foregoing descriptions of the layers' compositions, treatments, and so forth that are applicable to alternate embodiments disclosed below and to be viewed as working examples also, Table 1 below shows another example structure and components for an inventive, recyclable film, and Tables 2 and 3 list commercially available chemicals that may be used to make the film shown at Table 1. Each of Examples 1 and 2 shown in Tables 2 and 3, respectively, have a different untreated L1 skin layer, which allows the pressure-sensitive adhesive to release onto a face stock label film during label dispensing with a measured release force listed in Table 4.

To determine release label performance, a pressure-sensitive adhesive was applied to face stocks, e.g., Jindal Film's LABELLYTE film, before lamination to the untreated L1 skin layer of the inventive release layer shown in Examples 1 and 2. Other face stocks are possible in other embodiments without departing from the disclosed inventions. For example, such other face stocks could be any film, any polymer film, paper, or polyester.

The inventive example 1 the L1 layer comprises, consists essentially of or consists of a blend of 95% ExxonMobil Escorene Ultra FL 00209 (EVA), 4% Constab AB06001LD (silica 5 anti-block masterbatch), and 1% Constab SL05093LD (silicone masterbatch). This skin allows the pressure-sensitive adhesive to release onto a face stock label film during label dispensing with an acceptable release force.

Table 1 shows the structure and components in an example PE film in line with this disclosure, and Table 2 shows an example thereof with commercially available chemicals.

TABLE 1

| L1 | skin | about 0.5-2 µm | EVA silica antiblock optionally in masterbatch ("MB") solution silicone optionally in MB solution |
| --- | --- | --- | --- |
| L2 | tie | about 0.5-2 µm | HDPE olefin block copolymer ("OBC") mLLDPE |
| L3 | core | 10 to 50 µm | HDPE mLLDPE |
| L4 | tie | about 0.5-2 µm | HDPE OBC mLLDPE |
| L5 | skin | about 0.5-2 µm | EP copolymer mPP elastomer antiblock (silica and/or otherwise) optionally in MB solution optionally treated |

TABLE 2

Example 1

| Structure | | Wt. % | Material Trade Name | Thickness (µm) |
| --- | --- | --- | --- | --- |
| L1 | EVA | 95 | ExxonMobil Escorene Ultra FL 00209 | 1.3 |
| | silica antiblock optionally in masterbatch ("MB") solution | 4 | Constab AB06001LD | |
| | silicone optionally in MB solution | 1 | Constab SL05093LD | |
| L2 | HDPE | 60 | Nova 19A | 2.3 |
| | OBC | 20 | LyondellBasell Equistar Adflex X500F | |
| | mLLDPE | 20 | Dow XUS 59910.08 | |
| L3 | HDPE | 90 | Nova 19A | 17.8 |
| | mLLDPE | 10 | Dow XUS 59910.08 | |
| L4 | HDPE | 60 | Nova 19A | 2.3 |
| | OBC | 20 | LyondellBasell Equistar Adflex X500F | |
| | mLLDPE | 20 | Dow XUS 59910.08 | |
| L5 | EP copolymer | 67 | Ineos KS 407 | 0.8 |
| | mPP elastomer | 25 | Mitsui Tafmer PN-2060 | |
| | antiblock (silica and/or otherwise) optionally in MB solution (optionally a PE masterbatch solution) Treatment | 8 | Ampacet Seablock 4 | |
| | | | | 24.5 µm film |

TABLE 3

Example 2

| Structure | | Wt. % | Material Trade Name | Thickness (µm) |
| --- | --- | --- | --- | --- |
| L1 | EVA | 95 | ExxonMobil Escorene Ultra FL 00209 | 1.3 |
| | silica antiblock optionally in masterbatch ("MB") solution (optionally a PE masterbatch solution) | 4 | Constab AB06001LD | |
| | silicone optionally in MB solution | 1 | DuPont MB50-320 | |
| L2 | HDPE | 60 | Nova 19A | 2.3 |
| | OBC | 20 | LyondellBasell Equistar Adflex X500F | |
| | mLLDPE | 20 | Dow XUS 59910.08 | |
| L3 | HDPE | 90 | Nova 19A | 17.8 |
| | mLLDPE | 10 | Dow XUS 59910.08 | |
| L4 | HDPE | 60 | Nova 19A | 2.3 |
| | OBC | 20 | LyondellBasell Equistar Adflex X500F | |
| | mLLDPE | 20 | Dow XUS 59910.08 | |
| L5 | EP copolymer | 67 | Ineos KS 407 | 0.8 |
| | mPP elastomer | 25 | Mitsui Tafmer PN-2060 | |
| | antiblock (silica and/or otherwise) optionally in MB solution Treatment | 8 | Ampacet Seablock 4 | |
| | | | | 24.5 µm film |

In various embodiments, the adhesive may be water-based or solvent-based. And, the adhesive may be permanent or removable.

An unexpected result of the disclosed structures was that ability to coextrude as opposed to coating of embodiments, e.g., Examples 1 and 2 herein. In the disclosed embodiments, note that the face stock, whether paper, film, or otherwise, is not siliconized. Instead, the silicone is embedded within the release layer, i.e., L1 skin layer. Silicone is present only in this skin layer, and not elsewhere in the disclosed films in various embodiments. That is, the disclosed films are at least substantially free of silicone except for in one skin layer serving as the release liner, L1. If another other skin layer is present and is to function as a release layer too in alternate embodiments, then that other skin layer may also include silicone therein. This embedding creates efficiencies in costs, time, and materials.

Deviations from the ratios of the chemical composition in each of L1-L5 are possible without deviating from performance. With regard to L1, antiblock may be from about 1 wt. % through about 10 wt. %, silicone may be from about 0.5 wt. % through about 2.5 wt. % in a masterbatch solution, preferably polyethylene-base, and the balance may be EVA with the optional possibility of including additives as disclosed elsewhere in this disclosure. In other example embodiments, in place of EVA in L1, a polyethylene-based polymer is used, e.g., LDPE, MDPE, HDPE, terpolymers or combinations of the foregoing four types of polyethylene-based polymers. These substitutes are possible because there is no optical requirement in the release liner, which is thrown away generally.

With regard to deviations in L2 and L4, each component in each of these layers may be from about 5 wt. % though about 40 wt. % without pedantically listing each possible combination. But, for example's sake to ensure clarity, this would mean that HDPE, OBC, and mLLDPE could be in any combination where each of at least HDPE, OBC, and mLLDPE is at least about 5 wt. % and no more than about 40 wt. % with the optional possibility of including additives as disclosed elsewhere in this disclosure.

With regard to L5, the mPP elastomer may be from 0 wt. % though about 40 wt. %, antiblock may be from about 1 wt. % through about 10 wt. %, and the balance may be EP copolymer with the optional possibility of including additives as disclosed elsewhere in this disclosure. With regard to the core, L3, the HDPE may be from about 80, about 90, about 95, or about 98 wt. % HDPE, the balance being about 20% or less with or without additives as disclosed elsewhere in this disclosure.

To test pressure-sensitive release performance, the two inventive examples in Tables 1 and 2 were compared to two controls in terms of release force. The methodology used to test release force is disclosed in the final two pages of this disclosure. Other methodologies may be employed, and such other methodologies will provide at least the same results qualitatively, i.e., the substance of the following paragraph. The first control was a commercial siliconized paper release liner from 3M. The second control was an ETHYLYTE™ 25HD200 non-siliconized release liner from Jindal Films. All films were laminated to the same substrate, namely a 65-micron LABELLYTE-344-A label face stock ("S") before testing. Comparative results are shown in Table 4, wherein "A" is the same adhesive and "RL" is release liner.

films are not known in the art. This was demonstrated by the ETHYLYTE™ 25HD200 non-siliconized release liner control from Jindal. This control had a release force more than three times that of the siliconized-paper-release-liner control from 3M and the two inventive examples.

Currently, the pressure-sensitive-label market uses siliconized release liners when making label laminations. These siliconized release liners are made with paper and polymer films that are coated with silicone in a separate process step. However, this combination of dissimilar materials poses recyclability problems. Also, the separate process step adds cost to the final label structure.

There is strong interest in the market to drive products into recyclable and lower-cost structures. The invention in this disclosure solves recyclability problems by replacing paper and other polymer release liners in the lamination with a PE film. This creates the opportunity for an all-PE structure, which may be recycled while maintaining good pressure-sensitive-label-release performance. Furthermore, the disclosed invention reduces label cost by eliminating the separate silicone coating process step vis-à-vis coextruding.

While the foregoing is directed to example embodiments of the disclosed invention, other and further embodiments may be devised without departing from the basic scope thereof, wherein the scope of the disclosed compositions, systems and methods are determined by one or more claims.

What is claimed is:

1. A polyethylene film comprising:
   a core layer consists of low-density polyethylene, at least 85 wt. % high-density polyethylene, and, optionally, additives;
   a first tie layer on a first side of the core layer consisting essentially of: (i) at least about 50 wt. % high-density polyethylene; and (ii) from 5 wt. % through 40 wt. % of each of:
      (a) an olefin-block copolymer; and (b) low-density polyethylene polymer and/or ethylene-vinyl acetate polymer;
   a second tie layer on a second side of the core layer consisting essentially of: (i) at least about 50 wt. % high-density polyethylene; and (ii) from 5 wt. % through 40 wt. % of each of:
      (a) an olefin-block copolymer; and (b) low-density polyethylene polymer and/or ethylene-vinyl acetate polymer; and
   a first skin layer on the first tie layer, wherein the first skin layer is an outer layer and comprises a polyethylene-based polymer, silicone, and antiblock agent,
   wherein the polyethylene film is oriented and coextruded,

TABLE 4

| | | Release Force | | | | |
|---|---|---|---|---|---|---|
| | | Release Force (g/in) | | | | |
| Sample ID | Structure | Rep. 1 | Rep. 2 | Rep. 3 | Rep. 4 | Average |
| Control 1 | S/A/3M Siliconized Paper RL | 23 | 62 | 57 | 48 | 48 |
| Control 2 | S/A/25HD200 Non-Siliconized RL | 189 | 150 | 138 | 198 | 169 |
| Example 1 | S/A/Example 1 RL | 36 | 39 | 37 | 35 | 37 |
| Example 2 | S/A/Example 2 RL | 41 | 40 | 40 | 45 | 42 |

As shown in Table 4, the two inventive examples gave similar release forces to the siliconized paper release liner control from 3M. This is significant as coextruded release wherein the polyethylene film has a release force capable of excluding a siliconized release liner when pressure-sensitive adhered to a face stock.

2. The polyethylene film of claim 1, wherein the polyethylene film is pressure-sensitive adhered to face stock without the siliconized release liner.

3. The polyethylene film of claim 1, wherein the polyethylene film is monoaxially or biaxially oriented.

4. The polyethylene film of claim 1, wherein the antiblock agent is silica-based.

5. The polyethylene film of claim 1, wherein the antiblock agent and/or the silicone is in a polyethylene-based masterbatch solution.

6. The polyethylene film of claim 1, wherein the at least 85 wt. % high-density polyethylene consists of more than one polyethylene polymer with a density of at least 0.94 $g/cm^3$.

7. The polyethylene film of claim 1, wherein the core layer comprises at least 90 wt. % high-density polyethylene.

8. The polyethylene film of claim 1, further comprising one or more additives.

9. The polyethylene film of claim 1, wherein the low-density polymer is linear.

10. The polyethylene film of claim 1, further comprising a second skin layer on the second tie layer, wherein the second skin layer consists essentially of a polyethylene-based polymer.

11. The polyethylene film of claim 10, wherein the second skin layer excludes silicone.

12. The polyethylene film of claim 2, wherein the face stock is polyethylene face stock.

13. The polyethylene film of claim 1, wherein the polyethylene film is metallized, coated, primed, treated, and/or untreated.

14. The polyethylene film of claim 1, wherein the first skin layer consists of a polyethylene-based polymer, silicone, and antiblock agent.

15. The polyethylene film of claim 1, wherein the polyethylene-based polymer is ethylene-vinyl-acetate polymer.

16. The polyethylene film of claim 1, further comprising a second skin layer on the second tie layer.

17. The polyethylene film of claim 16, wherein the second tie layer has a different composition that the first tie layer.

18. The polyethylene film of claim 16, wherein the second tie layer comprises polyethylene copolymer, antiblock, and, optionally, polypropylene elastomer.

19. The polyethylene film of claim 2, wherein the face stock is not siliconized.

* * * * *